Aug. 18, 1970  J. C. LOUTON, JR  3,524,677
VEHICLE SEAT LATCH
Filed Aug. 26, 1968  2 Sheets-Sheet 1
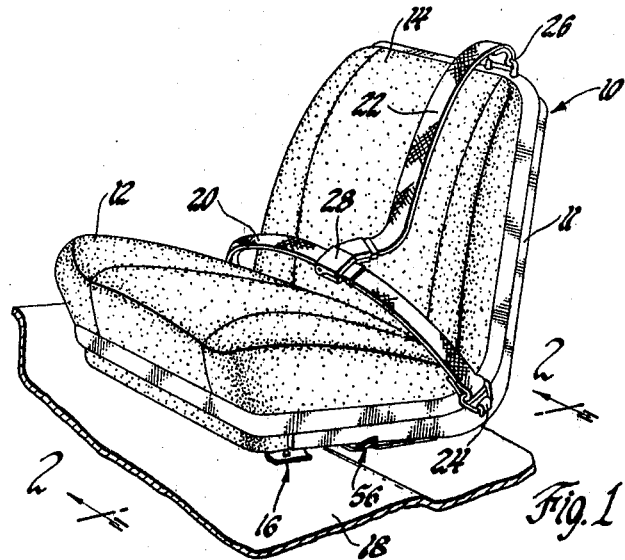
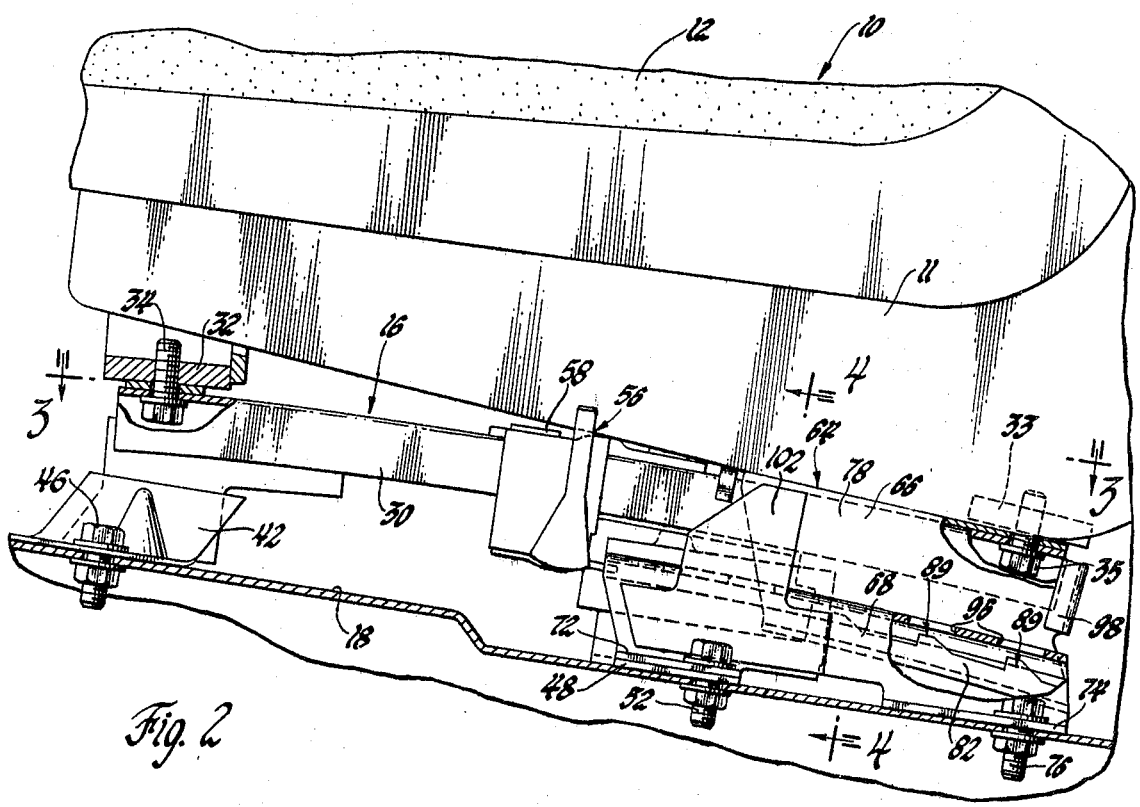
INVENTOR.
James C. Louton, Jr.
BY
E. J. Biskup
ATTORNEY Aug. 18, 1970  J. C. LOUTON, JR  3,524,677
VEHICLE SEAT LATCH Filed Aug. 26, 1968  2 Sheets-Sheet 2

INVENTOR.
James C. Louton, Jr.
BY
E. J. Biskup
ATTORNEY

United States Patent Office 3,524,677
Patented Aug. 18, 1970

3,524,677
VEHICLE SEAT LATCH
James C. Louton, Jr., Bloomfield Hills, Mich., assignor to General Motors Corporation, Detroit, Mich., a corporation of Delaware
Filed Aug. 26, 1968, Ser. No. 755,090
Int. Cl. B60n 1/08
U.S. Cl. 297—216        5 Claims

ABSTRACT OF THE DISCLOSURE

A seat structure incorporating seat belts and carried by a track unit for fore and aft adjustment that includes a latch device which limits seat movement in upwardly and forwardly directions when the seat is subjected to excessive loading.

---

In order to comply with Federal Motor Vehicle Safety Standards, vehicles are presently being equipped with seat and shoulder belts for protecting the occupant during a collision. The belts are expected to withstand high tension forces and are usually secured to the vehicle floor and roof. One drawback of this type of arrangement is that it requires the belts to be passed around or through the seat components when used by the seat occupant and also prevents the belts from being fastened until the seat is adjusted to a desired position. As a result, it has been proposed to have the restraint belts secured to the seat frame rather than the vehicle body so the belts will move with the seat during adjustment. As should be apparent, however, placing the belt anchor locations on the seat frame would subject the usual seat adjuster mechanism to extremely high forces under conditions when the vehicle is experiencing excessive deceleration and could cause the normally interlocked channel members to separate. Therefore, in cases where the belts are secured to the seat frame, it is important to have the seat provided with suitable means to limit the extent of movement the seat is permitted under the aforedescribed conditions and the present invention is directed to this end.

In the preferred form, this invention contemplates a latching device which is connected between the seat and vehicle floor and cooperates with the adjuster mechanism for limiting forward and upward movement of the seat under emergency conditions. The latch device can be connected to the usual seat adjuster that provides a plurality of positions for the seat or be located adjacent to the adjuster with one part connected rigidly to the seat structure and another part connected with the vehicle floor. More specifically, the latch device made according to the invention consists of two main parts, the unattached portions of which are formed as hooks which are vertically spaced apart during normal operation of the seat when being moved under the control of the seat adjuster. The hook ends of the latching device are adapted to interlock and limit upward movement of the rear portion of the seat in cases where the normal seat adjuster structure should separate during excessive loading.

The objects of the present invention are to provide a latching device for an adjustable seat equipped with seat belts; to provide a seat structure carried by a track unit for fore and aft adjustment that includes an auxiliary latching device which limits movement of the seat in an upwardly and forwardly direction under emergency conditions; to provide a vehicle seat having a plurality of adjusted positions that has fastened thereto a latching device which includes an interlocking arrangement that is effective to prevent upward movement of the seat structure when the latter assumes any of its adjusted positions; to provide a vehicle seat latch that cooperates with the usual seat adjuster mechanism for maintaining the seat in a fixed position if the latter is subjected to forces tending to raise the rear end of the seat upwardly or horizontally; and to provide a latch mechanism consisting of a pair of interlocking members, one of which is fastened to the underside of a seat and the other to the vehicle floor and which include cooperating teeth and slots which are interengageable in each adjusted position of the seat adjuster.

A more complete understanding of the invention can be derived from the following detailed description when taken with the drawings in which:

FIG. 1 is a perspective view showing a vehicle seat incorporating seat belts and a seat adjuster and including a latching device made in accordance with the invention;

FIG. 2 is an enlarged view taken on line 2—2 of FIG. 1 showing the seat adjuster and the latching device;

Figure 3:
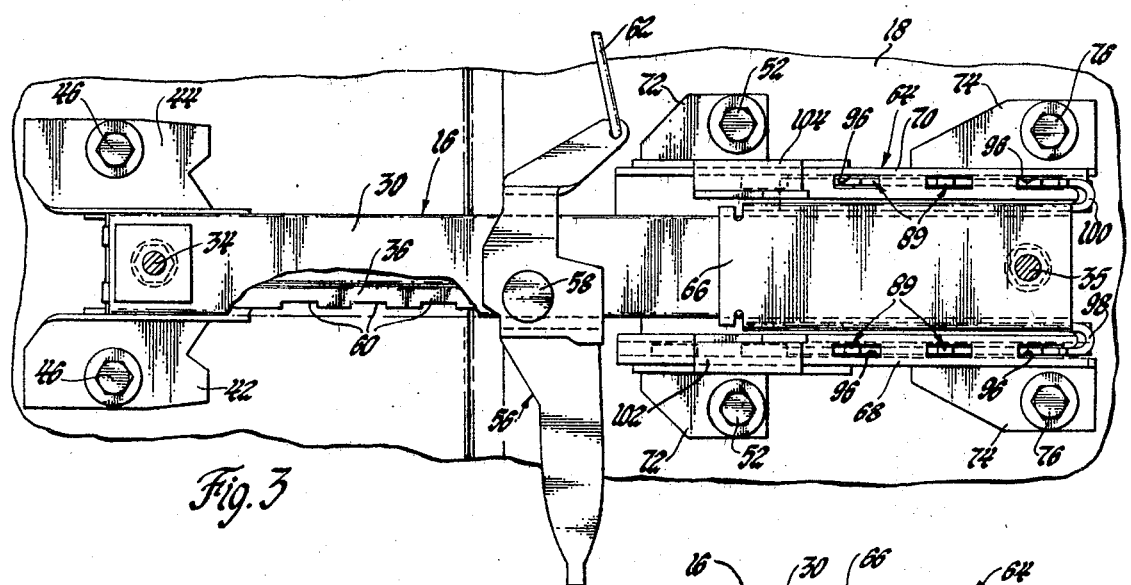
FIG. 3 is a view taken on line 3—3 of FIG. 2.

Referring to the drawings, FIG. 1 shows a bucket type vehicle seat 10 comprising an L-shaped frame 11 which supports the usual seat cushion 12 and back cushion 14. The bottom of the frame 11 is mounted on a pair of identical and laterally spaced longitudinally extending seat adjusters 16, one of which is shown in FIG. 2, which provide for fore and aft movement of the seat relative to a vehicle floor 18. The seat 10 is equipped with a pair of seat belts 20 and 22 which are anchored to the opposed sides of the frame 11 at points 24 and to the top of the frame at a point 26. A seat belt buckle 28 interconnects the belts 20 and 22 which respectively serve as lap and shoulder restraints for holding the seat occupant in the seat.

Figure 4:
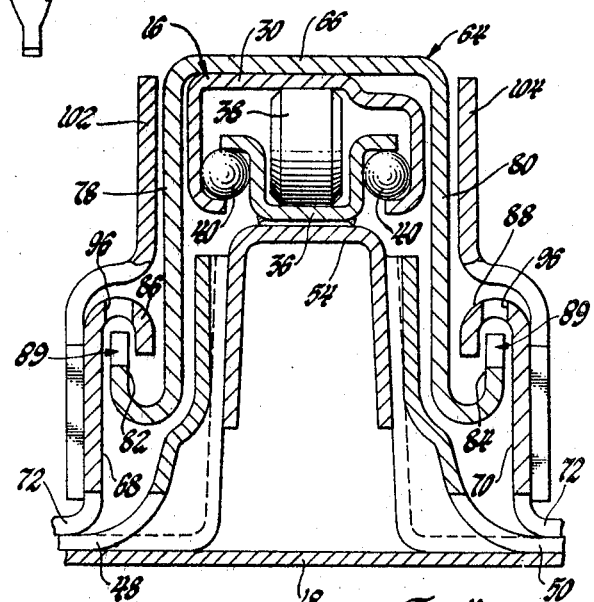
FIG. 4 is a further enlarged view taken on line 4—4 of FIG. 2.

More specifically and as seen in FIGS. 2 and 4, each seat adjuster 16 includes a track unit consisting of an upper channel member 30 having its forward and rearward ends secured to seat frame reinforcing cross members 32 and 33 by bolts 34 and 35. The upper channel member 30 is supported on and slidable longitudinally along a stationary lower channel member 36 through the usual roller bearings 38 and ball bearings 40 shown in FIG. 4. This track arrangement is conventional and very well known to those skilled in the art and, therefore, further detailed description is not deemed to be necessary.

As best shown in FIG. 3, the forward end of the lower channel member 36 is integrally formed with outwardly flared support arms 42 and 44, each of which is rigidly secured by a bolt 46 to the vehicle floor 18. An intermediate portion of the lower channel member 36 is also fixed to the floor 18 through a similar arrangement consisting of outwardly flared arms 48 and 50, each of which has a bolt passing therethrough for rigid connection with the vehicle floor 18. The latter arrangement can be understood more clearly by referring to FIG. 4 of the drawings where it is shown that a support member 54 is rigid with the lower channel member 36 and includes the arms 48 and 50 mentioned hereinbefore. As seen in FIGS. 2 and 3, a manually operable handle 56 is pivotally carried by the upper channel member 30 for rotation about a vertical axis passing through the pivotal connection 58. Although not shown, a tab is formed with the handle 56 and is adapted to move into one of a number of notches 60 formed in the lower channel member 36 for maintaining the seat adjuster 16 in one of the many adjusted positions it can assume as it carries the seat 10 in a fore and aft direction. Thus, as shown in FIG. 3, when the handle 56 is rotated in a clockwise direction, the tab moves out of the accommodating notch 60 and releases the upper channel member 30 so the seat 10 can be moved forwardly or rearwardly as desired by the seat occupant. Spring means (not shown) permit the handle 56 to return to its original position and cause the tab to engage one of the notches for locking the seat adjuster 16 in position, and a rod 62 serves to transmit movement of the handle 56 to the corresponding part associated with the seat adjuster located on the opposite side of the seat.

Where the seat belts are attached directly to the seat frame, as in the case of the seat 10 shown in FIG. 1, it should be apparent that deceleration forces will act directly on the seat structure which then will be transferred to the seat adjuster 16. In other words, with the seat belts 20 and 22 fastened about the torso of the occupant, excessive deceleration forces will cause the occupant's body to move forwardly exerting a horizontal forward force on the upper and lower portions of the seat which could tend to raise the lower rear portion of the seat 10 upwardly. In this regard, it will be noted that a latching device generally indicated by the numeral 64 is located adjacent to the rear portion of the seat 10 and is associated with the seat adjuster 16 so as to limit upward and horizontal movement of the seat 10 in any one of the many adjusted positions which the seat adjuster 16 can assume.

As seen in FIGS. 2–4, the latch device 64 comprises a downwardly opening channel member 66 which is interposed between the upper channel member 30 of the seat adjuster 16 and the lower portion of the seat frame 11. The bolt 35 which fastens the upper channel member 30 to the cross member 33 also serves as a fastening means for the channel member 66. The latch device 64 also includes a pair of laterally spaced plate members 68 and 70 which are located on opposite sides of the seat adjuster 16. Each of the plate members 68 and 70 include a pair of longitudinally spaced anchor portions 72 and 74 which respectively accommodate bolts 52 and 76 for affixing the plate members to the floor 18.

It will be noted that the channel member 66 includes a pair of laterally spaced side walls 78 and 80 having the lower ends thereof formed with outwardly offset and upwardly extending hook sections 82 and 84. Similarly, the upper ends of the plate members 68 and 70 are formed with laterally inwardly offset hook sections 86 and 88 which are opposed to and overlap the hook sections 82 and 84 formed with the side walls of the channel member 66. As best seen in FIGS. 2–5, the hook section of each side wall is formed with a plurality of longitudinally spaced teeth 89. Each of the teeth 89 is defined by forward and rearward walls 90 and 92 which are inclined forwardly and connected by a flat top surface 94. The hook section of each plate member is formed with a plurality of equally spaced rectangular slots 96 which are in vertical alignment with the teeth 89 and are adapted to accommodate the latter under conditions to be described. At this juncture, it should be noted there are three teeth 89 formed on each of the side walls 78, 80 and a greater number of slots 96 formed in each of the plate members 68, 70. It will also be noted that the spacing between the slots 96 of the latch device 64 is the same as the spacing between the notches 60 formed in the seat adjuster 16. Accordingly, whenever the seat adjuster 16 is in a locked position, the teeth 89 are located in vertical alignment with the slots 96.

The channel member 66 also has the rear portion of the side walls 78 and 80 formed with outwardly projecting hooks 98 and 100, respectively. The hooks 98 and 100 are adapted to cooperate with a pair of upright stop members 102 and 104 which are respectively secured to the plate members 68 and 70 as seen in FIGS. 3 and 4. Each of the stop members 102, 104 takes the form of a Z in cross section, with the lower end rigidly connected with the associated plate member, while the upper end is bent inwardly and upwardly adjacent to one of the side walls of the channel member 66. Under certain conditions, the seat could move in a horizontal direction without the rear end thereof lifting upwardly. If this should occur, the hooks 98 and 100 are adapted to engage the stop members 102 and 104 and limit such forward horizontal movement of the seat relative to the vehicle floor 18.

Figure 5:
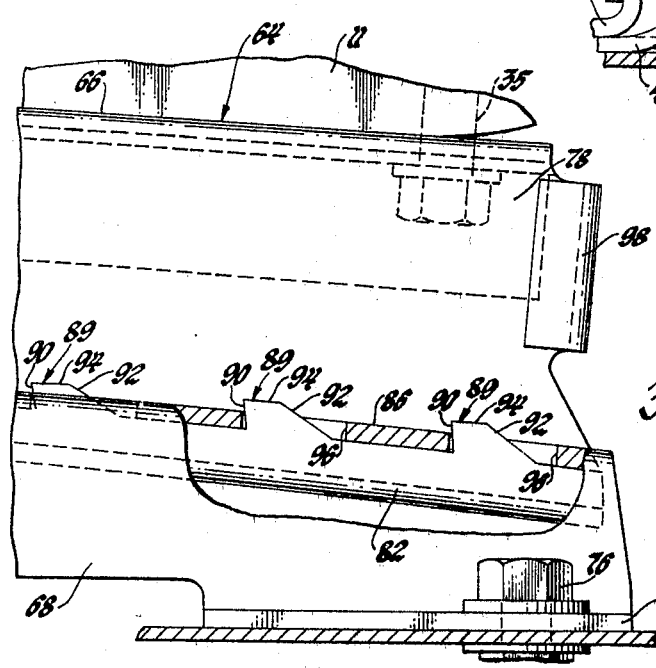
FIG. 5 is an enlarged view of the rear portion of the latch device shown in FIG. 2 but having the parts thereof interconnected.

Thus, from the above description is should be apparent that any force component which might tend to raise the rear of the seat in an upward direction, will be prevented from doing so by the latch device 64. In this regard, it can be seen that should the rear portion of the seat 10 move upwardly, the channel member 66 which is bolted to the rear of the seat 10 will follow the same path and cause a raising of the hook sections 82 and 84 formed with the side walls 78 and 80. Inasmuch as the teeth 89 of each hook section 82, 84 are aligned with the slots 96 formed in the plate members 68 and 70 in each adjusted position of the seat adjusters 16, the teeth 89 will enter the slots 96 and cause an interlocking of the channel member 66 with the plate members 68 and 70 as seen in FIG. 5. As alluded to hereinbefore, horizontal movement of the seat 10 is limited by the cooperating hooks 98, 100 and stop members 102, 104 as described above.

Various changes and modifications can be made in this construction without departing from the spirit of the invention. Such changes and modifications are contemplated by the inventor and he does not wish to be limited except by the scope of the appended claims.

I claim:

1. In a vehicle seat structure having a seat belt and shoulder belt attached thereto and supported at its lower end by the vehicle floor, a seat latch for limiting upward movement of the rear portion of said seat structure, said seat latch comprising a pair of laterally spaced substantially vertical and longitudinally extending walls fixed to the underside of said seat structure adjacent the rear thereof, each of said walls having the lower end thereof formed with a laterally offset upwardly extending hook section, a pair of substantially vertical and longitudinally extending plate members, each of said plate members fixed to said vehicle floor adjacent one of said walls and having the upper portion thereof formed with a laterally offset downwardly extending hook section opposed to and overlapping the upwardly extending hook section of the associated wall, one of the opposed hook sections having a plurality of equally spaced teeth formed thereon along the longitudinal axis thereof, the other of said hook sections having a plurality of apertures formed thereon and spaced substantially the same distance apart as said teeth, said teeth adapted to move into said apertures when the rear of the seat structure moves upwardly and forwardly relative to the vehicle floor.

2. In a vehicle seat structure having a seat belt and shoulder belt attached thereto and supported at its lower end by an adjustable track unit having a pair of relatively slidable longitudinally extending interlocked members, the upper one of which is rigid with the seat structure and the lower one rigid with the vehicle floor, a seat latch for limiting upward movement of the rear portion of the seat structure, said latch comprising a downwardly opening channel member interposed between the seat structure and the upper member of said track unit, said channel member including a pair of laterally spaced side walls straddling said track unit, each of said side walls having the lower end thereof formed with a laterally offset upwardly extending hook section, a pair of plate members, each of said plate members fixed to said vehicle floor adjacent one of said side walls and having the upper portion thereof formed with a laterally offset downwardly extending hook section opposed to and overlapping the upwardly extending hook section of the associated side wall, one of the opposed hook sections having a plurality of equally spaced teeth formed thereon along the longitudinal axis thereof, the other of said hook sections having a plurality of apertures formed thereon spaced substantially the same distance apart as said teeth, said teeth adapted to move into said apertures when the rear portion of said seat structure moves upwardly and forwardly relative to the vehicle floor.

3. In a vehicle seat structure having a seat belt and shoulder belt attached thereto and supported at its lower end by an adjustable track unit having a pair of relatively slidable longitudinally extending interlocked members, the upper one of which is rigid with the seat structure and the lower one rigid with the vehicle floor, the improvement wherein a downwardly opening channel member is interposed between the seat structure and the upper member of said track unit, said channel member including a pair of laterally spaced substantially vertical and longitudinally extending side walls straddling said track unit, each of said side walls having the lower end thereof formed with a laterally offset upwardly extending hook section, a pair of substantially vertical and longitudinally extending plate members, each of said plate members fixed to said vehicle floor adjacent one of said side walls and having the upper portion thereof formed with a laterally offset downwardly extending hook section opposed to and overlapping the upwardly extending hook section of the associated side wall, one of the opposed hook sections having a plurality of equally spaced teeth formed thereon along the longitudinal axis thereof, the other of said hook sections having a plurality of apetrures formed thereon along the longitudinal axis thereof and spaced substantially the same distance apart as said teeth, said teeth adapted to move into said apertures to limit upward and forward movement of the rear portion of said seat structure.

4. In a vehicle seat structure including a seat cushion and seat back and having a seat belt and shoulder belt attached thereto and supported at its lower end by an adjustable track unit having a pair of vertically spaced relatively slidable longitudinally extending interlocked members, the upper one of which is rigid with the seat structure and the lower one rigid with the vehicle floor, a seat latch for limiting unrestrained upward movement of the rear portion of the seat structure, said seat latch comprising a downwardly opening channel member rigidly secured to and interposed between a rear portion of the seat structure and the upper member of said track unit, said channel member including a pair of laterally spaced substantially vertical and longitudinally extending side walls straddling said track unit, each of said side walls having the lower end thereof formed with a laterally offset upwardly extending hook section, a pair of substantially vertical and longitudinally extending plate members, each of said plate members fixed to said vehicle floor and located adjacent one of said side walls and having the upper portion thereof formed with a laterally offset downwardly extending hook sections which normally is opposed and overlaps the upwardly extending hook section of the associated wall, one of the opposed hook sections having a plurality of equally spaced teeth formed thereon along the longitudinal axis thereof, the other of said hook sections having a plurality of apertures formed thereon and spaced substantially the same distance apart as said teeth, said teeth having forwardly inclined surfaces and being adapted to move into said apertures to limit upward and forward movement of the seat structure.

5. The vehicle seat structure of claim 4 wherein the rear of the channel member has outwardly extending vertically orientated hook members formed integrally with the channel member, and each plate member is provided with upstanding stop members which cooperate with said hook members for limiting horizontal movement of the seat relative to the vehicle floor.

References Cited

UNITED STATES PATENTS

| 2,278,101 | 3/1942 | Browne | 248—430 |
| 2,892,483 | 6/1959 | De Rose | 248—430 |
| 3,186,760 | 6/1965 | Lohr, et al. | 297—216 |
| 3,286,971 | 11/1966 | Walter et al. | 248—429 |

FOREIGN PATENTS

| 475,554 | 11/1937 | Great Britain. |
| 997,741 | 7/1965 | Great Britain. |
| 441,393 | 1/1936 | Great Britain. |

FRANCIS K. ZUGEL, Primary Examiner

U.S. Cl. X.R.

248—430